UNITED STATES PATENT OFFICE 2,181,832

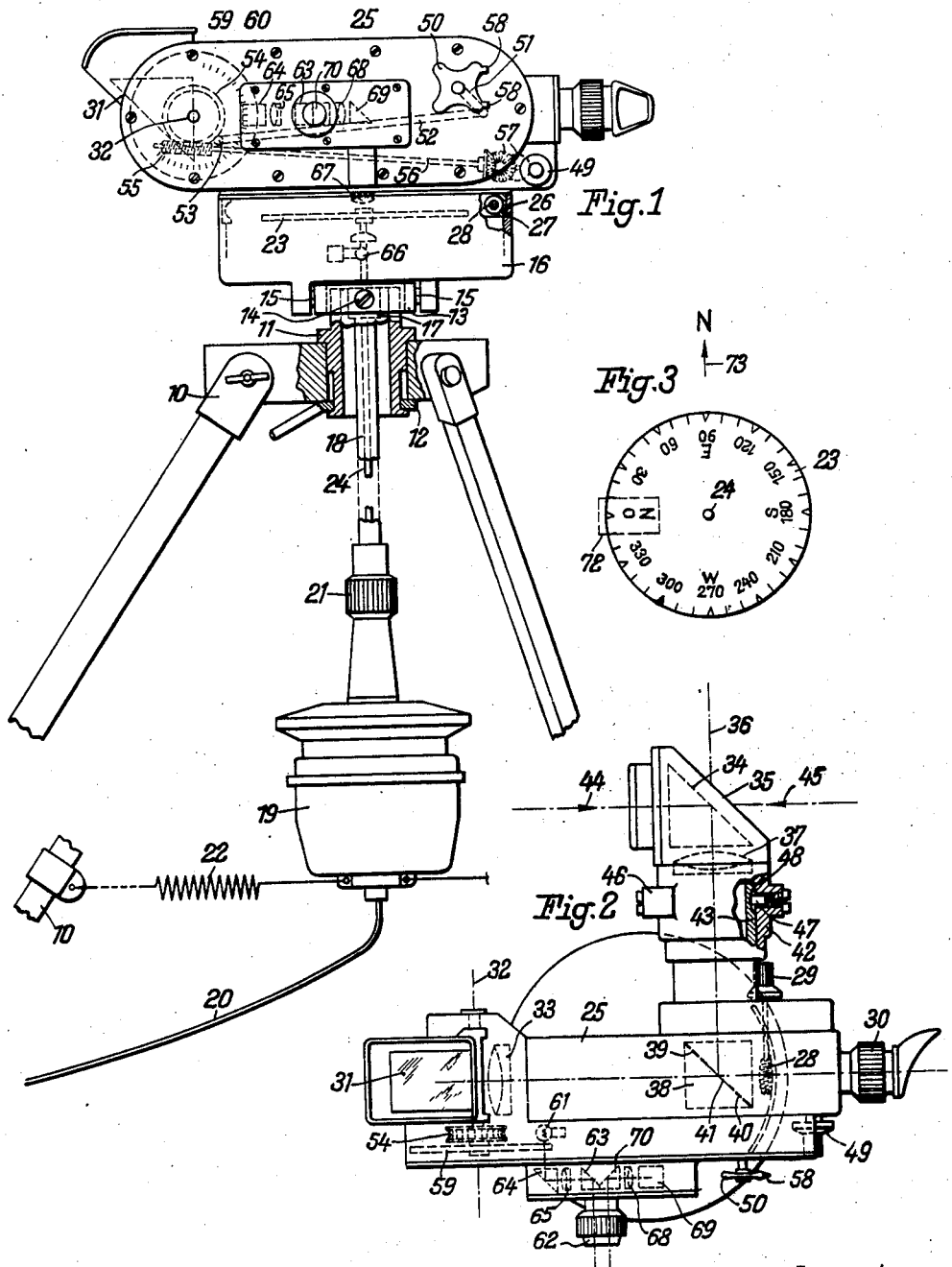

THEODOLITE

Kurt Moerbitz and Erwin Roux, Berlin, Germany, assignors to Askania-Werke A. G., a corporation of Germany Application February 17, 1938, Serial No. 191,121
In Germany February 22, 1937

6 Claims. (Cl. 88—2.7)

This invention relates to improvements in theodolites, more particularly to improvements in shipboard theodolites for making balloon observations at sea.

It is an object of this invention to provide an improved theodolite by means of which all necessary observation data can be taken by two operators, in distinction to the conventional type of instrument for which three operators are required, one for adjusting the instrument, one for taking elevation and azimuth readings and a third for determining the change of the course of the ship during the observation.

It is another object of this invention to provide an improved theodolite which will permit an accurate determination of the position of an object above a hazy horizon.

Further aims, objects, and advantages of this invention will appear from a consideration of the description which follows with the accompanying drawing showing for purely illustrative purposes an embodiment of this invention. It is to be understood, however, that the description is not to be taken in a limiting sense, the scope of this invention being defined in the appended claims.

Referring to the drawing:

Fig. 1 is an elevation, partly in section, of a theodolite according to this invention.

Fig. 2 is a plan view of the instrument shown in Fig. 1.

Fig. 3 shows a compass card for use in the illustrated theodolite.

A support shown in the illustrated example as being a tripod 10 and provided with a central collar 11 held in place by a clamping ring 12 carries a gimbal ring 13 in horizontal pivots 14. The gimbal ring, in turn, is provided with a second pair of pivots 15 for supporting a table 16 for universal movement about the gimbal axis. The table is provided with an extension 17 into which a downwardly extending rod 18 is inserted carrying a bowl 19 of a compass, in the illustrated embodiment shown as being a repeater compass connected to a gyro compass by means of a cable 20 and secured to the rod through a coupling 21. The compass thus serves to counterbalance the table, maintaining the same in a level position regardless of the movements of the ship. Undue oscillations of the compass and rod which thus form a pendulum may be prevented by means of springs 22 connected to the compass bowl and the tripod, respectively. A transparent compass card 23 is maintained fixed in azimuth by the repeater compass to which it is connected by means of a shaft 24, thereby establishing a standard of direction for the instrument.

An instrument casing 25 is mounted on the table 16 for movement in azimuth, the axis of rotation corresponding with the axis of the shaft 18 carrying the compass card 23. An internally threaded ring 26 frictionally engaging the table at 27 meshes with a worm 28 rotatably mounted in the casing and permitting an adjustment of the casing in azimuth relatively to the compass card by means of the knob 29.

Optical means are provided in the casing 25 to permit an observation of movements in elevation of an object through an eye-piece 30. In the illustrated embodiment the optical means include an index prism 31 mounted in the casing for adjustment about a horizontal axis 32 parallel to the reflecting face of the prism and producing an image by means of an objective lens 33.

A second path of light for establishing a reference line for the observation is provided by optical means for observing the horizon. In the illustrated embodiment a second prism 34 is mounted in a head 35 adjustable about a horizontal axis 36 and producing an image of the horizon by means of an objective 37. The images of the objectives 33 and 37 are superadded upon each other and directed into the eye-piece 30 by means of a double prism 38 having reflecting side portions 39 and 40 and a transparent central portion 41.

The head 35 having a sleeve 42 is rotatable on a tube 43 of the casing 25 and arrested in the two horizontal positions indicated by arrows 44 and 45 by means of spring loaded detents 46 and 47, the latter being shown in section and engaging a notch 48 in the tube 43.

For adjustment of the index prism in elevation a knob 49 and a handle 50 are provided. The handle 50 for effecting an initial and rapid adjustment is connected with a lever 51 linked to a rod 52, the rod being connected to the support of the prism-carrying-support at 53. For fine adjustment of the prism a worm wheel 54 is provided frictionally engaging the prism shaft 32 and meshing with a worm 55 on a spindle 56 driven from the knob 49 over a train of gears 57. The handle 51 in the illustrated embodiment is provided with a peep sight 58 for "shooting" at the object.

When the instrument is rapidly adjusted in azimuth by manually turning the instrument casing 25 in azimuth, or in elevation by adjusting the index prism by operating the handle 50, the threaded ring 26 and the worm wheel 54 are permitted to slide relatively to the table and the prism shaft, respectively, by virtue of their frictional engagement.

For determining the elevation angle the index prism is provided with an elevation arc or disk 59 secured to the prism shaft 32. A graduation 60 on the transparent disk is illuminated by a bulb 61 and read through an eye-piece 62 over prisms 63 and 64 and an objective lens 65. The azimuth reading of the instrument is taken through the same eye-piece 62, an image of the compass card 23 illuminated by a bulb 66 being produced in the eye-piece by lenses 67, 68 and prisms 69 and 70.

Inasmuch as the reading of the compass card 23 is taken at the side of the instrument as indicated by the rectangle 72 in Fig. 3, the compass card is attached to the rod 24 in a position differing from the true geographical direction by 90 degrees as shown in the figure in which the arrow 73 indicates the North direction.

From the foregoing description it appears that for operating the improved theodolite only two observers are required, one for adjusting the instrument in azimuth and elevation and a second for taking the readings. Irrespective of changes of the course of the vessel during the observation the correct azimuth position can be determined by observing the compass card through the eye-piece 62. Likewise the elevation reading taken through the eye-piece 61 is correct, since the observation adjustment remains unaffected from rolling and pitching movements of the vessel, the object having the same apparent motion as the horizon.

Generally, observations are taken by determining the elevation of the object under observation with reference to the horizon below the object. If it happens, however, that the horizon in that particular section is not visible on account of haze or fog, correct measurements can still be taken with the improved instrument by using as reference line the horizon visible in the opposite direction, the instrument being adjusted for this purpose by simply turning the prism head 34 into the opposite direction.

Obviously, the present invention is not restricted to the particular embodiment herein shown and described. Moreover, it is not indispensable that all the features of this invention be used conjointly, since they may be employed advantageously in various combinations and subcombinations.

What is claimed is:

1. Theodolite comprising, in combination, a support; a table mounted on said support in horizontal gimbals; a vertical rod secured to said table; a directional instrument suspended from said rod, thereby counterbalancing said table; an instrument casing mounted on said table for movement about a vertical axis; first optical means mounted in said casing and including a reflecting member movable about a horizontal axis parallel to the reflecting face thereof said first means providing a path of light for observing objects in elevation; second optical means mounted in said casing for providing a second and horizontal path of light; an eye-piece; means for reflecting into said eye-piece said first and second path of light; means for determining the angle of inclination of said reflecting member; and means for determining the position in azimuth of said casing relatively to said directional instrument.

2. Theodolite comprising, in combination, a support; a table mounted on said support in horizontal gimbals; a compass suspended from said table, thereby counterbalancing the same said compass including a card movable in azimuth relatively to said table; an instrument casing mounted on said table for movement about a vertical axis; first optical means mounted in said casing and including a reflecting member movable about a horizontal axis parallel to the reflecting face thereof said first means providing a path of light for observing objects in elevation; second optical means mounted in said casing for providing a second and horizontal path of light; an eye-piece; means for reflecting into said eye-piece said first and second path of light; means for determining the angle of inclination of said reflecting member; and means for determining the position in azimuth of said casing relatively to said compass card.

3. Theodolite comprising, in combination, a support; a table mounted on said support in horizontal gimbals; a vertical rod secured to said table; a directional instrument suspended from said rod, thereby counterbalancing said table; an instrument casing mounted on said table for movement about a vertical axis; first optical means mounted in said casing and including a first reflecting member movable about a horizontal axis parallel to the reflecting face thereof, said first means providing a path of light for observing objects in elevation; second optical means mounted in said casing for providing a second and horizontal path of light, said second means including a second reflecting member adjustably mounted about an axis for alternatively receiving light from one of two opposite horizontal directions; an eye-piece; means for reflecting into said eye-piece said first and second path of light; means for determining the angle of inclination of said first reflecting member; and means for determining the position in azimuth of said casing relatively to said directional instrument.

4. Theodolite comprising, in combination, a support; a table mounted on said support in horizontal gimbals; a compass suspended from said table, thereby counterbalancing the same, said compass including a card movable in azimuth relatively to said table; an instrument casing mounted on said table for movement about a vertical axis; first optical means mounted in said casing and including a reflecting member movable about a horizontal axis parallel to the reflecting face thereof, said first means providing a path of light for observing objects in elevation; second optical means mounted in said casing for providing a second and horizontal path of light; a first eye-piece; means for reflecting into said first eye-piece said first and second path of light; and optical means including a second eye-piece mounted on said casing for determining the angle of inclination of said first reflecting member and the position in azimuth of said casing relatively to said compass card.

5. Theodolite comprising, in combination, a support; a table mounted on said support in horizontal gimbals; a compass suspended from said table, thereby counterbalancing the same, said compass including a card movable in azimuth relatively to said table; an instrument casing mounted on said table for movement about a vertical axis; first optical means mounted in said casing and including a reflecting member movable about a horizontal axis parallel to the reflecting face thereof, said first means providing a path of light for observing objects in elevation; second optical means mounted in said casing for providing a second and horizontal path of light, said second means including a second reflecting member adjustably mounted about an axis for alternatively receiving light from one of two opposite horizontal directions; a first eye-piece; means for reflecting into said first eye-piece said first and second path of light; and optical means including a second eye-piece mounted on said casing for determining the angle of inclination of said first reflecting member and the position in azimuth of said casing relatively to said compass card.

6. Theodolite comprising, in combination, an eye-piece; an index prism in the path of light of said eye-piece and of a first objective for scanning objects in elevation, said first objective being mounted adjacent to said index prism; a second prism in the path of light of said eye-piece and of a second objective mounted adjacent to said second prism; means for adjustably supporting said second prism about a horizontal axis for alternately receiving light from one of two opposite horizontal directions; and a double prism mounted between the eye-piece and said objectives, said double prism having a semi-transparent reflecting surface transmitting light from the index prism and from the second prism to the eye-piece.

KURT MOERBITZ.
ERWIN ROUX.